United States Patent
Pillar et al.

(10) Patent No.: US 6,501,762 B1
(45) Date of Patent: Dec. 31, 2002

(54) SCHEDULER IMPLEMENTING WEIGHTED FAIR QUEUING BY A WEIGHT LIMITED FIRST IN-FIRST OUT METHODOLOGY

(75) Inventors: John Pillar, Nepean (CA); Bernard Marchand, Cantley (CA); Jacob Guttman, Nepean (CA); Sitaram Patro, Nepean (CA)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/295,215

(22) Filed: Apr. 21, 1999

(51) Int. Cl.$^7$ .............................................. H04L 12/28
(52) U.S. Cl. ...................... 370/412; 370/233
(58) Field of Search .............................. 370/233, 235.1, 370/412, 413, 415, 417, 229, 230.1

(56) References Cited

U.S. PATENT DOCUMENTS

| | | | | |
|---|---|---|---|---|
| 5,274,644 A | * | 12/1993 | Berger et al. | 370/230 |
| 5,818,815 A | * | 10/1998 | Carpentier et al. | 370/230.1 |
| 6,308,214 B1 | * | 10/2001 | Plevyak et al. | 709/225 |
| 6,341,134 B1 | * | 1/2002 | Toutain et al. | 370/412 |
| 6,389,019 B1 | * | 5/2002 | Fan et al. | 370/233 |
| 6,408,005 B1 | * | 6/2002 | Fan et al. | 370/412 |
| 6,438,134 B1 | * | 8/2002 | Chow et al. | 370/230 |

FOREIGN PATENT DOCUMENTS

EP 000843499 A2 * 11/1997 ........... H04Q/11/04

OTHER PUBLICATIONS

Burakowski. "Better: Handling Best Effort Traffic in the ATM Networks". Military Comunications Conference, 1998. IEEE. Oct. 18–21, 1998. pp. 787–791.*

Briem. "Traffic Management for an ATM Switch with Per–VC Queuing: Concept and Implementation". IEEE Communications Magazine. Sep. 21–26, 1997. pp. 88–93.*

M. Shinohara et al. "Multiclass Large Scale ATM Switch with QoS Guarantee". Communications 1997. IEEE Conference. Jun. 8–12, 1997.*

M. R. Hashemi et al. "The Single–Queue Switch: A Building Block for Switches with Programmable Scheduling." Selected Areas in Communication IEEE. vol. 15, Issue 5. Jun. 1997.*

H. Kondoh et al. "An Efficent Self–timed Queue Architecture". IEEE Custom Integrated Circuits Conference, 1994. May 1–4, 1994.*

S. Bodamer et al. "Scheduling and Bandwidth Allocation for Flow Aggregates in Multi–Service Networks". Institue of Communication Networks and Computer Engineering Pfaffenwaldring 47, D–70569 Stuttgart. Date not given.*

* cited by examiner

*Primary Examiner*—Melvin Marcelo
*Assistant Examiner*—Derrick W Ferris
(74) *Attorney, Agent, or Firm*—Gibbons, Del Deo, Dolan, Griffinger & Vecchione (57) ABSTRACT

Scheduler methods and apparatus utilize a weight limited FIFO (WLF) method to provide weighted per-connection queuing while maximizing preservation of cell arrival order, thus minimizing additional cell delay variation (CDV) added during scheduling. The invention minimizes additional CDV of a connection until the connection exceeds its fair share of resource utilization.

32 Claims, 4 Drawing Sheets

142 - 148: PER CONNECTION QUEUES

FIGURE 1

* PER CONNECTION QUEUES 142 - 148
** PER SUB - CONNECTION QUEUES 242 - 248

FIGURE 2

FIGURE 3   142 - 149: PER CONNECTION QUEUES

142 - 144: PER CONNECTION QUEUES

FIGURE 4

SCHEDULER IMPLEMENTING WEIGHTED FAIR QUEUING BY A WEIGHT LIMITED FIRST IN-FIRST OUT METHODOLOGY

FIELD OF INVENTION

This invention relates generally to intra-class, per-connection schedulers for digital link systems, such as aysnchronous transfer mode (ATM) telecommunications systems, and more particularly, provides a novel scheduler implementing weighted fair queuing by a weight limited first in-first out methodology.

BACKGROUND OF THE INVENTION

Information regarding ATM systems can be found in the ATM Forum, "ATM User-Network Interface Specification," Version 3.1, September, 1994, and in Martin de Prycker, "Asynchronous Transfer Mode: Solution for Broadband ISDN," Ellis Horwood, N.Y. 1993, both of which are incorporated herein by reference. Aspects of ATM Systems are disclosed in U.S. Pat. Nos. 5,818,815, 5,794,025, and 5,768,259, also incorporated herein by reference.

An advantage of high bandwidth, fixed length cell based transfer mode techniques, such as ATM, Frame Relay, IP, etc., is the capability of high-speed, low-delay multiplexing and switching of different types of user information traffic— including data, voice, image and video—over the same network, while optimizing bandwidth and resource utilization. In ATM connection-oriented networks, the end-to-end traffic of data for one user, between the source and the destination, is represented by a virtual connection (VC). Several VCs can be grouped into a virtual path (VP) that can be switched as a unit.

An ATM system segments user traffic into fixed-length cells. A header in each cell typically includes a virtual channel identifier (VCI) and a virtual path identifier (VPI) associated with the corresponding cell. The VCI and VPI fields together identify a virtual channel connection that is established when a user requests a network connection in an ATM system. The allocation of available transmission opportunities or slots to user traffic cells is generally referred to as cell scheduling. Devices that accomplish this task are called schedulers.

In a data communication system, such as an ATM system, data can optimally be differentiated by classes (e.g., voice, video, data, and other digital signals). A class scheduler allocates opportunities to the different classes, generally by strict priority or some variation thereof which may incorporate some minimum guarantees to each class. Opportunities, once allocates to a class, must be allocated to connections within the class by a second-order scheduler. A scheduler which operates in this manner is called an intra-class scheduler. An intra-class, per-connection scheduler (i) monitors the status of an input queue for each connection in a given class of service; and (ii) according to some pre-defined criteria, makes decisions about the connection to be serviced at the next transmission opportunity. A digital switching apparatus utilizes these decisions to select a connection for the next transmission opportunity.

The same scheduler can also be used to allocate opportunities of one connection to multiple sub connections according to some pre-defined criteria. Such behavior can be used to schedule virtual channel connections (VCCs) into a virtual path connection (VPC). A scheduler which operates in this manner is called a sub-connection scheduler.

The intra-class per-connection scheduler thus enables the digital link system to determine which connection will utilize the next share of limited bandwidth or processor resources. These decisions are important to the performance of bandwidth-limited digital link systems. Scheduling at the intra-class level of per-connection queues is a major problem to be resolved in cell-based networks.

At the intra-class scheduler level a goal of scheduling is to ensure fairness within a particular class (i.e. attempting to provide transmission opportunities for an equal amount of data for each user while taking into account the relative amount of bandwidth required or subscribed to by a user, that is, that user's "share"). A goal of scheduling is to provide fair access to that share without adding unnecessary delay into the system.

A conventional scheduling algorithm utilized is a Round Robin algorithm. In Round Robin the scheduler polls, or inspects the queue belonging to the connection of each user in a round robin fashion (i.e. one at a time in a predefined repeating order).

There are several disadvantages to the Round Robin algorithm. The scheduler visits the queue belonging to the connection of each user without taking into account the amount of bandwidth to which that user subscribes and/or the amount of data that connection is transmitting. Another disadvantage is that a cell may be required to wait in a per connection queue while the scheduler polls all other per connection queues before that queue is inspected by the scheduler (even if that queue is the only queue attempting to transmit data). Moreover, the length of time a cell must wait is a function of chance. For example, a cell may arrive in a particular per connection queue just as the Round Robin scheduler is about to inspect that queue for available cells, in which case that cell will encounter a relatively low transit delay. However, another cell from the same connection may arrive just after that per connection queue has been inspected (visited), in which case that cell will encounter a relatively high transit delay. Thus, the cell delay variation (CDV) through a Round Robin scheduler is high.

Since CDV is a significant constraint in system design, and since many factors that contribute to CDV are beyond the control of the system design, it is very important that any algorithm designed to ensure fairness does not unnecessarily increase CDV, as the Round Robin algorithm does.

An improvement to the Round Robin system includes the weighted burst Round Robin algorithm. In weighted burst Round Robin the number of contiguous cell opportunities that a connection can utilize when the queue for that connection is polled is dependent upon the relative weight of that connection. Thus, when a connection's queue is polled by the scheduler, the most that connection can transmit is the number of cells equal to its weight (i.e. the connection can send a "burst" of data). Although this algorithm provides a more flexible definition of fairness than the Round Robin, due to its burst nature, the possibility of increased CDV is even greater. In the Round Robin, a maximum of one cell of a user's data is sent when the queue belonging to their connection is visited. However, in the weighted burst Round Robin, a connection of high relative weight can monopolize all cell opportunities for that class for a significant length of time.

Another conventional improvement to the Round Robin algorithm is the weighted interleaved Round Robin algorithm. In this algorithm, connections with a weight greater than 1 are allocated more than one position in the Round Robin pattern. Thus, rather than a single position with multiple cell transmit opportunities, a connection may be provided with multiple smaller bandwidth positions which combined provide the same transmit opportunities spread out over different positions. In this sense, the burst will be spread out over time, somewhat reducing the additional CDV introduced into the system. Unfortunately, some additional CDV is still introduced, which remains a function of chance as to when a cell arrives relative to the inspection of the per connection queue. Further, a weighted interleaved Round Robin algorithm is complex to implement.

Accordingly, a need exists for providing intra-class level scheduling on a weighted fair basis, while limiting the amount of additional CDV introduced to the system.

It is thus an object of the invention to provide relatively low-cost, relatively simple and efficient scheduling mechanisms. It is another object of the invention to provide such mechanisms which minimize the introduction of additional CDV and which provide weighted fairness among connections. It is yet another object of this invention to provide a first in-first out (FIFO) mechanism that preserves the cell arrival order, so that a connection can expect it's cell to be sent in the order upon which it is received by a single common queue.

SUMMARY OF THE INVENTION

These and other objects are attained by the invention, which in one aspect provides a method of scheduling a plurality of data flows within a class of service for digital traffic over a limited bandwidth outgoing datapath. The method includes establishing a FIFO order for scheduling of data flow through a single common queue feeding this datapath, limiting a connection's access to this single common queue when the number of cells in the single common queue belonging to this connection has reached the integer weight value for that connection, storing an overflow of the data from the connection in a per connection queue, and moving data from a per connection queue into the common queue when an equivalent of data belonging to that connection has been removed from the common queue and sent over the outgoing datapath. The integer weight value for a connection is not fixed, but may vary to take into account an increase or decrease in the number of connections.

The method of the invention also includes further establishing a FIFO order for scheduling of data flow through a tributary single common queue feeding a connection, limiting access by a sub-connection to this tributary single common queue when the number of cells in the tributary single common queue belonging to the sub-connection has reached the integer weight value for that sub-connection, storing an overflow of the data from that sub-connection in a per sub-connection queue, and moving data from a per sub-connection queue into the tributary common queue when an equivalent of data belonging to that sub-connection has been removed from the tributary common queue and sent to the connection. The integer weight value of a sub-connection is not fixed, but may vary to take into account an increase or decrease in the number of sub-connections.

In another embodiment, the invention includes a scheduler for a digital link system which schedules multiple data flows over a limited bandwidth outgoing datapath and within a class of service for digital traffic. The scheduler includes a single common queue configured as a FIFO queue. It also includes a per connection FIFO queue coupled to the single common queue and configured to receive an overflow of data from the single common queue, wherein the overflow includes data transmitted from a connection to the single common queue in excess of an integer weight value for the connection.

The scheduler of the invention also includes a tributary single common queue configured as a FIFO queue, and a per sub-connection queue coupled to the tributary single connection queue and configured to receive an overflow of data from the tributary single connection queue, wherein said overflow includes data transmitted from a sub-connection to the tributary single connection queue in excess of an integer weight value for the sub-connection.

The invention will now be described in connection with certain exemplary embodiments; however, it should be clear to those skilled in the art that various modifications, additions and subtractions can be made without departing from the spirit or scope of the invention and the claims herein.

BRIEF DESCRIPTION OF THE DRAWINGS

The invention will be more clearly understood by reference to the following detailed description of an exemplary embodiment in conjunction with the accompanying drawings, in which.

DESCRIPTION OF ILLUSTRATED EMBODIMENTS

The present invention is an intra-class scheduler which employs weighted fair queuing (WFQ), which in turn employs a weight limited FIFO (WLF) algorithm. A scheduler in accordance with the present invention is illustrated schematically in FIG. 1. A further scheduler in accordance with the present invention, and including weighted fair queuing of sub-connections within a connection, by a weight limited FIFO method, is illustrated schematically in FIG. 2.

Figure 1:
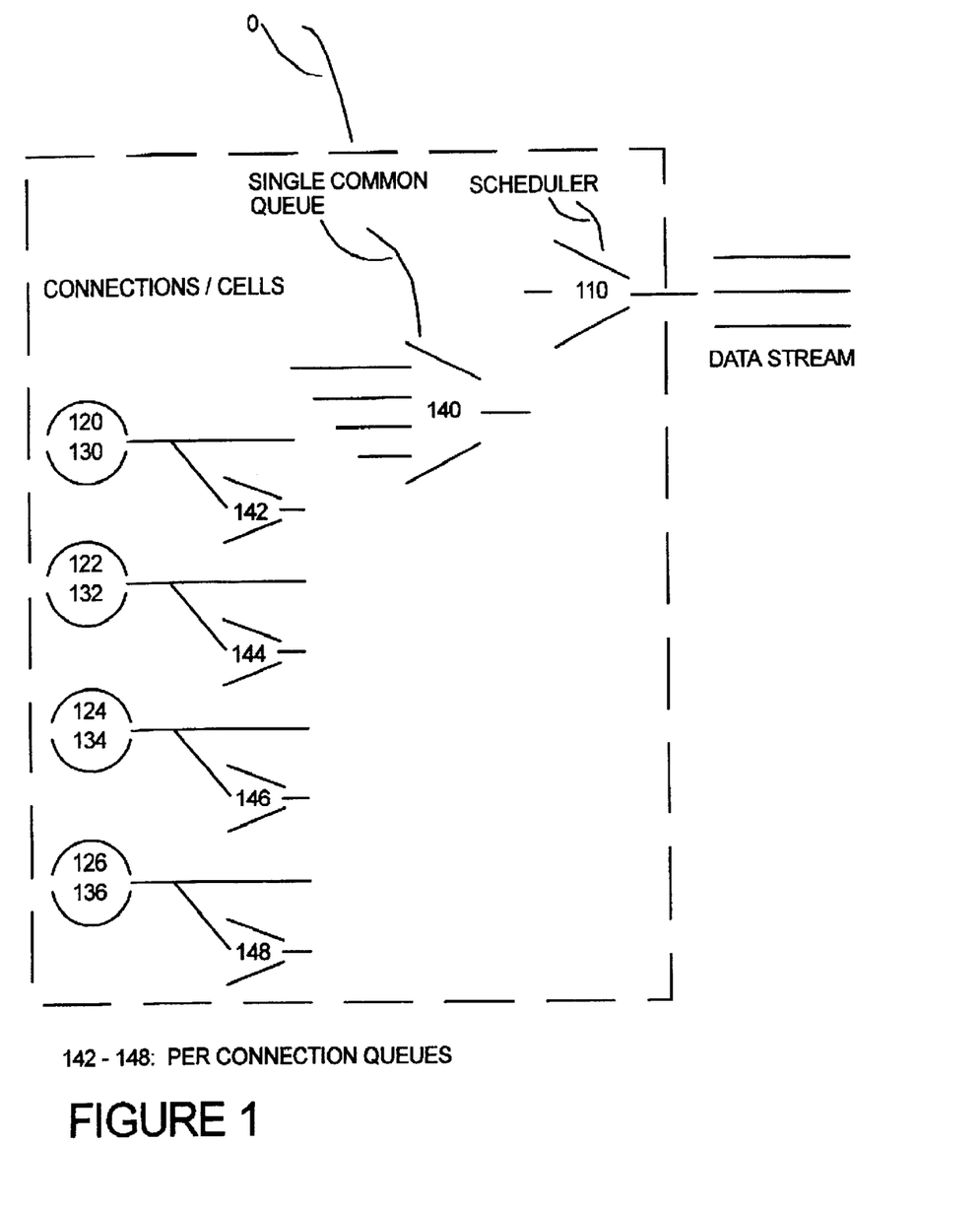
FIG. 1 is a schematic diagram depicting a scheduler implementing weighted fair queuing by a weight limited FIFO method in accordance with the invention.

FIG. 1 shows a system 100 including an intra-class scheduler 110. Those skilled in the art will appreciate that the functions of the intra-class scheduler 110 described herein can be implemented in hardware (e.g. an application-specific integrated circuit (ASIC), programmable logic array (PLA), a microprocessor, etc.) or in software.

The system illustrated in FIG. 1 shows four connections 120, 122, 124, 126 to the intra-class scheduler 110 through single common queue (SCQ) 140 which may be integral with the scheduler 110 or an adjunct thereto. Those skilled in the art will recognize that while only four connections are illustrated, more or fewer connections are possible and the number of connections is not required to be static. FIG. 1 also illustrates per-connection queues (PCQs) or overflow queues 142, 144, 146, 148 (discussed further below).

Each connection 120–126 may contain a number of cells, 130, 132, 134, 136, representative of the amount of data that connection is attempting to send to the SCQ 140. However, the number of cells, 130–136, that each connection, 120–126, is allowed to enqueue into the SCQ 140 is limited by the relative weight subscribed to by that connection.

The following will describe the operation of system 100 when the class of data is given the opportunity to use the network. Connection 120 transmits data, in the form of cells, to the single common queue 140. The relative weight of connection 120 (number of cells from connection 120 allowed in the SCQ 140 at one time) and the number of cells 130 that connection 120 is attempting to transmit is ascertained. Based upon the relative weight and number of cells 130 ascertained, the cells 130 are either (i) all allowed to enter the SCQ 140 or (ii) some cells are allowed to enter SCQ 140 while others are sent to overflow PCQ 142 to wait for subscribed bandwidth to become available.

The following discussion will be based upon the following configuration and is being used for illustration purposes only and is not intended as limiting the invention to any particular configuration. Connection 120 subscribes to a weight of 5 cells, connection 122 subscribes to a weight of 1 cell, connection 124 subscribes to a weight of 2 cells, and connection 126 subscribes to a weight of 1 cell, as shown in the following chart:

| Connection | Weight | Minimum Percentage of Available Bandwidth* |
|---|---|---|
| 120 | 5 | 5/9 = 55.5% |
| 122 | 1 | 1/9 = 11.1% |
| 124 | 2 | 2/9 = 22.2% |
| 126 | 1 | 1/9 = 11.1% |

*Minimum Percentage of Available Bandwidth refers to that percentage a connection receives when all connections seek to transmit at a rate higher than their instantaneous allotment.

These weights mean that the most cells connection 120 will be allowed to have in the SCQ 140 at a given time is 5 (even if no other connections within the class are contending for transmit opportunities at that instant in time). The most cells connection 122 will be allowed to have in the SCQ 140 at a given time is 1. The most cells connection 124 will be allowed to have in the SCQ 140 at a given time is 2, and the most cells connection 126 will be allowed to have in the SCQ 140 at a given time is 1. Thus, if connection 124 is the only connection attempting to transmit cells, but connection 124 is attempting to transmit 5 cells, 2 of the cells will be entered into the SCQ 140 for transmission by the intra-class scheduler and 3 of the cells will be placed into the PCQ 146. This absolute subscribed weight limitation in access by a connection to the SCQ 140 ensures that (i) no connection is allowed to monopolize the queue, (ii) that the largest delays are experienced by connections which are sending at a rate higher than their instantaneous allotted fair weight, and (iii) the additional CDV experienced by a connection is minimized when the connection is sending at a rate less than its instantaneous allotted fair weight.

If bandwidth is limited then the number of cells from a connection that can be enqueued directly into the SCQ 140 is equal to the relative subscribed weight of that connection. As stated in the chart above, if the total available bandwidth is 9 (exemplary only) and all connections attempt to use their allotted weight at the same time, connection 120's absolute relative weight is 5/9 or 55.5% because connection 120 has 5 of a total of 9 subscribed cells. This is the largest weight connection 120 will be allowed. Thus, even if only connections 120, 122 and 124 are attempting to use their allotted weight, and connection 120's relative weight would be 5/8 or 62.5%, connection 120 will still be limited to 5 cells at a time. However, if another connection 128 is added with a subscribed weight of 4 cells for example, and all connections attempt to utilize their full weight allocation at the same time, then connection 120 will only have 5/13 or 38.4% share of the bandwidth (i.e. 3.4 cells which will round down to the nearest whole cell 3). Thus, any connection's relative weight is a function of that connection's subscribed weight and all other subscriptions attempting to use the bandwidth at the same time.

In the example where sufficient bandwidth is available, if user 120 desires to send 10 cells to SCQ 140 only 5 cells will go directly to SCQ 140, while the other 5 cells will be sent to PCQ 142. Once one of the 5 cells is transmitted by SCQ 140 (the data is sent), one of connection 120's cells which is stored in PCQ 142 is sent to SCQ 140. Then that cell enters the SCQ 140 based on the FIFO algorithm. When no other user is sending data, connection 120 will see virtually no additional delay. However, if users 122, 124 and 126 each are trying to send cells, FIFO will determine the order in which the cells are queued in SCQ 140.

In an extreme situation, it should be apparent that there will be additional CDV approximating a weighted Round Robin method. All users will be attempting to send more cells than they have subscribed to, and possibly more cells than the actual bandwidth can handle. In such a situation, any cells not sent directly to SCQ 140 are sent to PCQs 142–148 and then to SCQ 140 as a cell for a particular connection 120–126 is transmitted from SCQ 140. FIFO ensures that any additional CDV experienced by a channel will not be entirely random but will, instead, be based upon when a connection sends data, the weight the connection subscribes to and whether that connection is over-using the subscribed bandwidth.

Since the active relative weight going to SCQ 140 may constantly be changing, the additional CDV may change. In a typical system, SCQ 140 may always be full. However, based on FIFO and the amount subscribed, the connections may still send their cells to the PCQs 142–148 for later transmission based on FIFO and relative weight. The FIFO mechanism ensures that the cell arrival order will be preserved. Thus, a connection can expect it's cell to be sent in the order upon which it is received by SCQ 140. Any additional CDV is in the time it will take to get to SCQ 140 which is determined by that connection's subscription and the traffic through the intra-class scheduler 110. The time is not entirely determined by any preset order and/or the start time of the user.

It can be seen that the invention efficiently attains the objects set forth above. The invention provides a relatively inexpensive, simple and efficient mechanism for intra-class, per connection weighted fair queuing, while minimizing additional CDV for users operating within their subscribed limits.

Figure 2:
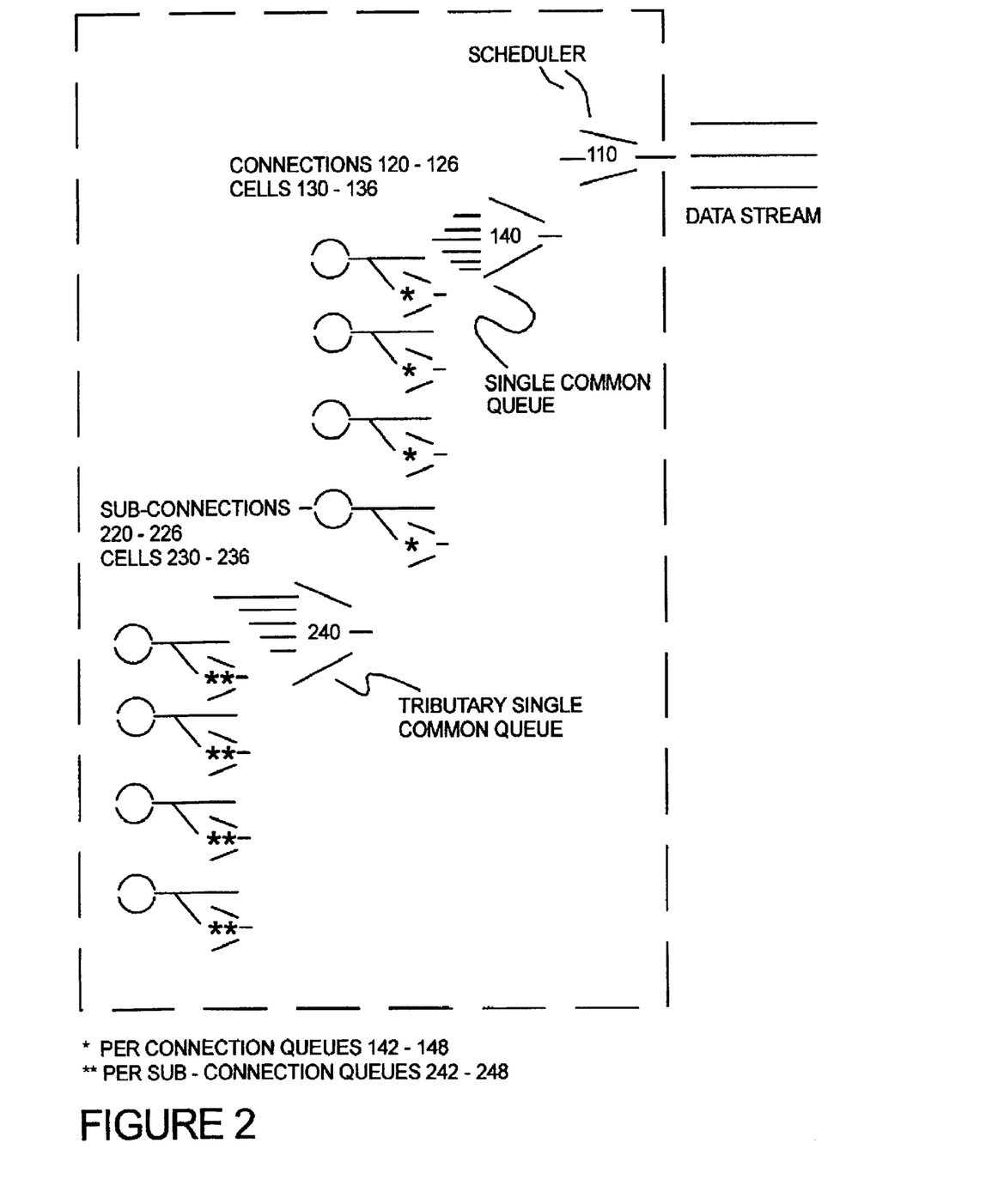
FIG. 2 is a schematic diagram depicting a scheduler implementing weighted fair queuing, including weighted fair queuing of sub-connections within a connection, by a weight limited FIFO method in accordance with the invention.

The system illustrated in FIG. 2 shows four connections 120, 122, 124, 126 to the intra-class scheduler 110 through SCQ 140. The system further shows four sub-connections 220, 222, 224, 226 to the connection 226 through tributary SCQ (TSCQ) 240. Those skilled in the art will recognize that while sub-connections only to one of the connections are illustrated, and also while only four sub-connections are illustrated, more than one connection may have sub-connections, and more or fewer sub-connections are possible. It should also be recognized that the number of sub-connections is not static, nor need it be uniform among connections. FIG. 2 also illustrates per-sub-connection queues (PSCQs) or sub-connection overflow queues 242, 244, 246, 248 (discussed further below).

Each sub-connection 220–226 may contain a number of cells 230, 232, 234, 236, representative of the amount of data that sub-connection is attempting to send to the TSCQ 240. However, the number of cells 230–236 that each sub-connection 220–226 is allowed to enqueue into the TSCQ 240 (and thus into connection 126) is limited by the relative weight subscribed to by that sub-connection.

The following will describe the operation of system 100 when two schedulers are cascaded. In this example, there are four (4) connections 120–126 and four (4) sub-connections 220–226 within connection 126. Connections 120–124 may be either VCCs or VPCs; however, connection 126, having sub-connections 220–226, is the source of a VPC. Sub-connections 220–226 are VCCs that are being merged into connection 126.

The following weights are assigned:

| Connection | Weight | Sub-connection | Weight |
|---|---|---|---|
| 120 | 15 | 220 | 10 |
| 122 | 20 | 222 | 20 |
| 124 | 25 | 224 | 30 |
| 126 | 40 | 226 | 40 |

In this example, connections 120–126 will share the class, and will receive a 15%, 20%, 25% and 40% share of the class, respectively. The 40% share of connection 126, in turn, will be further distributed among the sub-connections 220–226, with the sub-connections receiving 10%, 20%, 30% and 40% shares of connection 126. In this example, sub-connection 226 will receive 40% of the 40% share of connection 126, or 16% of the class.

Connections 120–124 will behave as described above in relation to a single level connection scheduler. When connection 126 attempts to transmit cells, it, too, will behave as described above in relation to a single level class scheduler.

When sub-connection 220 attempts to transmit a number of cells greater than its share, the excess cells will be stored in PSCQ 242, and the cells within the share of sub-connection 220 will be transmitted to TSCQ 240, and from there to connection 126.

Alternatively, when sub-connection 222 attempts to transmit a number of cells not in excess of its share, and the number of cells that connection 126 is attempting to transmit is less than its share, then the cells from sub-connection 222 will be enqueued via TSCQ 240 into connection 126 and then to SCQ 140, and the number of cells attempting to be transmitted by sub-connection 222 and connection 126 will be incremented.

In still another alternative, where sub-connection 224 is attempting to transmit cells, if the number of cells sought to be transmitted by connection 126 exceeds its share, but the number of cells sought to be transmitted by sub-connection 224 does not exceed its share, then those cells sought to be transmitted by sub-connection 224 will be transmitted through TSCQ 240 into connection 126, and will be stored in PCQ 148, which is the per-connection FIFO queue corresponding to connection 126.

As an example, assume connection 126 is attempting to transmit 45 cells and sub-connection 222 is attempting to transmit 25 cells. When a new cell appears, connection 126 has exceeded its subscribed weight and sub-connection 222 has exceeded its subscribed weight, as well. Accordingly, the new cells will be stored in PSCQ 244.

As another example, assume connection 126 is attempting to transmit 35 cells and sub-connection 224 is attempting to transmit 0 cells. When a new cell appears, connection 126 is not attempting to transmit in excess of its subscribed weight, so the new cell will be enqueued via TSCQ 140 and transmitted to connection 126 to be enqueued in SCQ 140.

As a third example, assume connection 126 is attempting to transmit 45 cells and sub-connection 226 is attempting to transmit 20 cells. Because sub-connection 226 is not attempting to transmit in excess of its subscribed weight, when a new cell appears, it will be enqueued in the TSCQ 240. However, because connection 126 is attempting to transmit cells in excess of its subscribed weight, the new cell, rather than being enqueued in SCQ 140, will be stored in PCQ 148.

Figure 3:
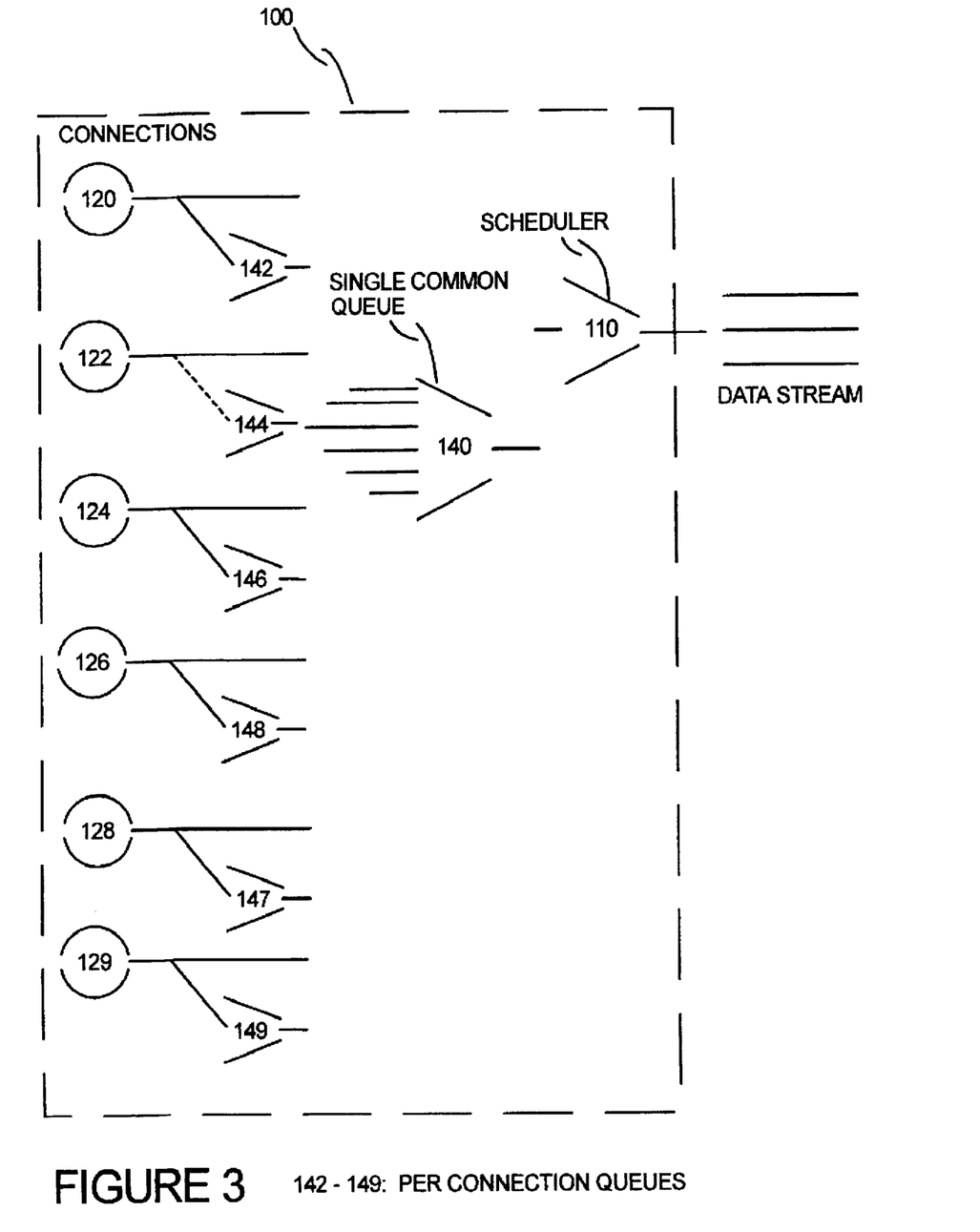
FIG. 3 is a schematic diagram of the scheduler depicted in FIG. 1, with two connections added.

In the examples and embodiments set forth above, it was assumed that the weight assigned to a connection or sub-connection was a static integer. However, the following will describe the operation of system 100 depicted in FIG. 1 when the weight of connections 120–126 can be adjusted to either a greater or lesser weight. As depicted in FIG. 3, assume that connections 128 and 129 are added to system 100 of FIG. 1. The sum of all weights assigned to each connection will be increased by the weight of connections 128 and 129 such that the respective share of each of connections 120–126 is decreased. However, the object of this embodiment of the invention is to preserve the share of a particular connection, such as connection 122, by increasing the weight of connection 122 such that its share will unchanged, that is, as it was prior to the addition of connections 128 and 129.

Figure 4:
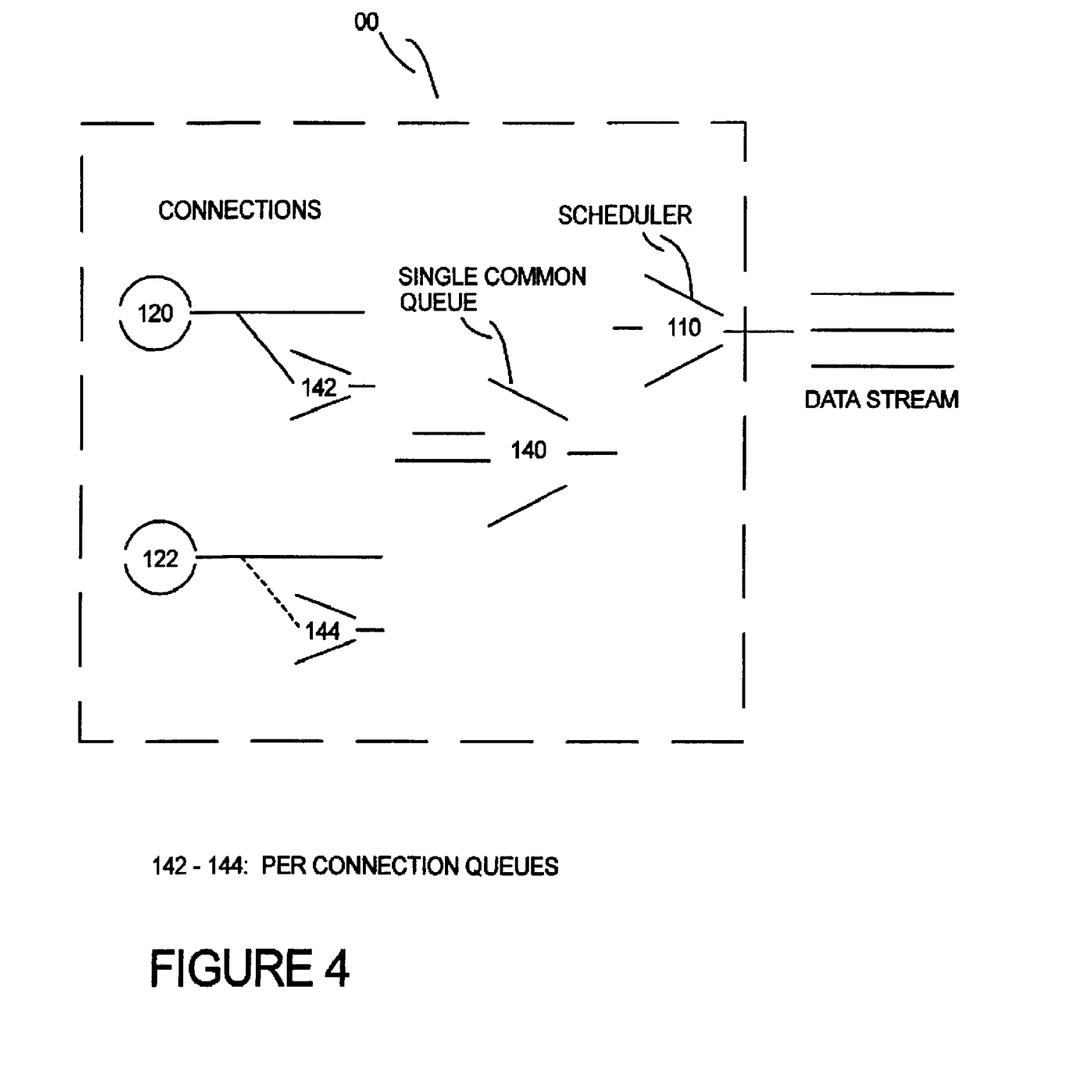
FIG. 4 is a schematic diagram of the scheduler depicted in FIG. 1, with two connections deleted.

Alternatively, as depicted in FIG. 4, if connections 124 and 126 are removed from system 100 of FIG. 1, the sum of the weight of the remaining connections 120 and 122 decreases such that the share of each connection 120 and 122 will increase. To preserve their share prior to the removal of connections 124 and 126, the weight of connections 120 and 122 would have to be decreased.

In the example depicted in FIG. 3, where the number of cells sought to be transmitted by (appearance count of) connection 122 is less than its share, those cells are already going to SCQ 140. Therefore, increasing the weight of connection 122 to compensate for the greater overall weight directed and thereby maintain its share, simply means that more cells will now go to the SCQ 140.

On the other hand, where connection 122 is sending a number of cells equal to or in excess of its share, the excess cells are being sent to PCQ 144. If the overall weight is changed to a higher value, the respective share of each connection, including connection 122, will be reduced and new cells arriving will be sent to PCQ 144. However, increasing connection 122's weight to maintain its share prior to the overall weight increase will result in a cell from PCQ 144 being transferred to SCQ 140 at the same time which will cause the appearance count to go up and converge to the increased share.

In FIG. 4, if the appearance count of connections 120 and 122 is lower than the increased share resulting from the loss of connections 124 and 126, cells are already going to SCQ 140 and reducing the weight of connections 120 and 122 to reduce their respective shares simply means that the weight limit of connections 120 and 122 will be reached faster. Therefore, the share should simply be changed.

If, on the other hand, the appearance count of connections 120 and 122 is equal to the respective increased share (due to the loss of overall weight when connections 124 and 126 were lost), decreasing that share will bring the weight limit below the appearance count. Thus, new cells will be queued on PCQ 142 and 144, respectively. In that scenario, cells leaving the SCQ 140 will not cause a transfer from PCQ 142 and 144, and the appearance count will be decreased until it becomes equal to the share of connections 120 and 122. Then, normal operation resumes.

It will be understood that changes may be made in the above construction and in the foregoing sequences of operation without departing from the scope of the invention. It is accordingly intended that all matter contained in the above description or shown in the accompanying drawings be interpreted as illustrative rather than in a limiting sense.

It is also to be understood that the following claims are intended to cover all of the generic and specific features of the invention as described herein, and all statements of the scope of the invention which, as a matter of language, might be said to fall therebetween.

Having described the invention, what is claimed is:

1. A method of scheduling a plurality of data flows within a class of service for digital traffic over a limited bandwidth outgoing datapath, comprising the steps of:
    establishing a first in-first out (FIFO) order for scheduling of data flow through a single common queue feeding said datapath;
    limiting access by each of a plurality of connections to said single common queue when a number of cells in said single common queue belonging to said connection has reached an integer weight value for said connections; and
    storing an overflow of data from said connections in a per connection queue.

2. The method of claim 1, further comprising the step of moving data from said per connection queue into said single common queue when an equivalent of data belonging to one of said connections has been removed from said single common queue and sent over said outgoing datapath.

3. The method of claim 1, where said integer weight value for each of said connections is variable.

4. The method according to claim 1, further comprising the steps of:
    further establishing a FIFO order for scheduling of data flow through a tributary single common queue feeding said connections;
    limiting access by sub-connections to said tributary single common queue when a number of cells in said tributary single common queue belonging to said sub-connections has reached an integer weight value for said sub-connections; and
    storing an overflow of said data from said sub-connection in a per sub-connection queue.

5. The method of claim 4, where said integer weight value for each of said sub-connections is variable.

6. The method of claim 4, further comprising the step of moving data from said per sub-connection queue into said tributary single common queue when an equivalent of data belonging to said sub-connection has been removed from said tributary single common queue and sent to said connections.

7. A scheduler for a digital link system which schedules a plurality of data flows over a limited bandwidth outgoing datapath and within a class of service for digital traffic, comprising:
    a single common queue configured as a FIFO queue; and
    a per connection queue coupled to said single connection queue and configured to receive an overflow of data from said single connection queue, wherein said overflow includes data transmitted from said connections to said single connection queue in excess of an integer weight value for said connections.

8. The scheduler of claim 7, wherein said per connection queue also is configured to move data from said per connection queue into said single common queue when an equivalent of data belonging to said connections has been removed from said single common queue and sent over said outgoing datapath.

9. The scheduler of claim 7, wherein said integer weight value for each of said connections is variable.

10. The scheduler of claim 7, further comprising:
    a tributary single common queue configured as a FIFO queue; and
    a per sub-connection queue coupled to said tributary single connection queue and configured to receive an overflow of data from said tributary single connection queue, wherein said overflow includes data transmitted from one of said sub-connections to said tributary single connection queue in excess of an integer weight value for said one of said sub-connections.

11. The scheduler of claim 10, wherein said per sub-connection queue also is configured to move data from said per sub-connection queue into said tributary single common queue when an equivalent of data belonging to said sub-connection has been removed from said tributary single common queue and sent to one of said connections.

12. The scheduler of claim 10, wherein said integer weight value for each of said sub-connections is variable.

13. A scheduler for a digital link system which schedules a plurality of data flows over a limited bandwidth outgoing datapath and within a class of service for digital traffic, comprising:
    queuing means for sending data transmitted from a connection on a FIFO basis; and
    storage means coupled to said queuing means, for receiving an overflow of data from said queuing means, said overflow including data transmitted from one of a plurality of connections to said queuing means in excess of an integer weight value for said one connection.

14. The scheduler of claim 13, wherein said integer weight value for each of said connections is variable.

15. A scheduler as in claim 13, wherein said storage means also moves said overflow from said storage means into said queuing means when an equivalent of data belonging to one of said connections has been removed from said queuing means and sent over said outgoing datapath.

16. A scheduler as in claim 13, further comprising:
    queuing means for sending data transmitted from one of a plurality of sub-connections on a FIFO basis; and
    storage means coupled to said queuing means, for receiving an overflow of data from said queuing means, said overflow including data transmitted from said one sub-connection to said queuing means in excess of an integer weight value for said one sub-connection.

17. A scheduler as in claim 16, wherein said integer weight value for each of said sub-connections is variable.

18. A scheduler as in claim 16, wherein said storage means also moves said overflow from said storage means into said queuing means when an equivalent of data belonging to said one of said sub-connections has been removed from said queuing means and sent to said one connection.

19. An intra-class, per connection weighted fair queuing apparatus, comprising
    a plurality of connections each configured to transmit cells of data;
    a single, common queue having subscribed bandwidth;
    an intra-class scheduler configured to allocate shares of the subscribed bandwidth that is available in the single, common queue to the plurality of connections so that each of the connections is allotted a respective share of the subscribed bandwidth, the single; and a per-connection queue, the connections being configured to transmit at least one cell of data to the single, common queue that, in an aggregate amount, take up at most the respective share of the subscribed bandwidth and to transmit to the per-connection queue at least one further cell of data, if any, that, when added to the aggregate, exceed the respective share of the subscribed bandwidth available, the common queue being configured to accommodate the at least one cell of data, the per-connection queue being configured to accommodate the at least one further cell of data and to transmit the at least one further cell of data to the single, common queue after waiting until the respective share of the subscribed bandwidth becomes available that corresponds to the connection from which the at least one further cell of data was transmitted.

20. An apparatus as in claim 19, wherein the at least one cell of data include a plurality of cells of data that are differentiated by classes into different classes, the at least one connection including a plurality of connections, each of the different classes being allocated respective transmission opportunities, the intra-class scheduler configured to allocate the respective transmission opportunities of the different classes to the plurality of connections so that the plurality of connections transmit the plurality of cells of data in accordance with the respective transmission opportunities.

21. An apparatus as in claim 19, wherein the per-connection queue is arranged to receive an overflow of data from the single common queue, the overflow including the at least one further cell of data, the at least one further cell of data being in excess of an integer weight value associated with the at least one connection.

22. An apparatus as in claim 19, further comprising a data stream channel that experiences cell delay variation that is based upon when one of the connections transmit the cells of data, a weight that the one connection subscribes to, and whether the one connection is overusing the share of the subscribed bandwidth that is available.

23. An apparatus as in claim 22, wherein the single common queue has a first in first out mechanism that ensures that the cell delay variation is so based.

24. A method of intra-class, per connection weighted fair queuing, comprising
allocating shares of subscribed bandwidth that is available in a single, common queue to a plurality of connections so that each of the connections is allotted a respective share of the subscribed bandwidth,
transmitting at least one cell of data from at least one of the plurality of connections to the single, common queue that, in an aggregate amount, take up at most the respective share of the subscribed bandwidth;
accommodating the at least one cell of data by the single, common queue;
transmitting at least one further cell of data from the at least one of the plurality of connections to a per-connection queue that, when added to the aggregate, exceed the respective share of the subscribed bandwidth;
accommodating the at least one further cell of data in the per-connection queue;
waiting until the respective share of the subscribed bandwidth becomes available that corresponds to the connection from which the at least one further cell of data was transmitted; and
after the waiting, transmitting the at least one further cell of data to the single, common queue from the per-connection queue.

25. A method as in claim 24, wherein the at least one connection transmits the at least one cell of data and the at least one further cell of data in a sequential order, the single, common queue receiving the at least one cell of data and, after the waiting, the at least one further cell of data, in a same sequence as the sequential order.

26. A method as in claim 24, wherein the receiving includes receiving an overflow, the overflow including data from at least one of the connections that is in excess of an integer weight value associated with the at least one connections.

27. An apparatus as in claim 24, further comprising experiencing cell delay variation that is based upon when one of the connections transmit the cells of data, a weight that the one connection subscribes to, and whether the one connection is overusing the share of the subscribed bandwidth that is available.

28. A method as in claim 27, further comprising ensuring that the cell delay variation is so based by providing the single common queue with a first in first out mechanism.

29. A method as in claim 24, further comprising adjusting weights of the connections to preserve the allocated shares of access to the subscriber available bandwidth to compensate for changes in a number of the connections present.

30. A method as in claim 24, wherein the at least one cell of data include cells of data that are differentiated by classes into different classes, each of the different classes being allocated respective transmission opportunities, further comprising allocating the respective transmission opportunities of the different classes to the connections, the connections being configured to transmit in accordance with the respective transmission opportunities.

31. A scheduler as in claim 7, wherein the data flows include cells of data differentiated by classes into different classes, each of the different classes being allocated respective transmission opportunities, further comprising an intra-class scheduler configured to allocate the respective transmission opportunities of the different classes to the connections, the connections being configured to transmit in accordance with the respective transmission opportunities.

32. A scheduler as in claim 13, wherein the data flows include cells of data differentiated by classes into different classes, each of the different classes being allocated respective transmission opportunities, further comprising an intra-class scheduler configured to allocate the respective transmission opportunities of the different classes to the connections, the connections being configured to transmit in accordance with the respective transmission opportunities.

* * * * *